United States Patent [19]

Wilwerding

[11] 4,250,377
[45] Feb. 10, 1981

[54] LOW CONTRAST BIAS AUTO FOCUS SYSTEM

[75] Inventor: Dennis J. Wilwerding, Littleton, Colo.

[73] Assignee: Honeywell Inc., Minneapolis, Minn.

[21] Appl. No.: 99,235

[22] Filed: Nov. 30, 1979

[51] Int. Cl.³ .............................................. G01F 1/20
[52] U.S. Cl. ..................................... 250/204; 354/25
[58] Field of Search ................. 250/201, 204; 354/25; 356/21

[56] References Cited

U.S. PATENT DOCUMENTS 4,085,320  4/1978  Wilwerding ......................... 250/201

Primary Examiner—David C. Nelms
Assistant Examiner—Darwin R. Hostetter
Attorney, Agent, or Firm—Charles J. Ungemach

[57] ABSTRACT

A low cost auto focus system employing a bias signal source to cause the system to focus at the infinity or hyperfocal distance when very low contrast conditions exist.

8 Claims, 5 Drawing Figures

LOW CONTRAST BIAS AUTO FOCUS SYSTEM

BACKGROUND OF THE INVENTION

In a copending application of Norman L. Stauffer, Ser. No. 085,821, filed Oct. 17, 1979, a low cost auto focus system was shown wherein as few as two radiation responsive detector pairs were mounted behind an auxillary lens and a pair of lenslets so as to produce four signals identified as $a_1$, $b_1$, $a_2$ and $b_2$ which were operated upon to produce an output signal V that varied in accordance with the equation: $V = |\log a_1/b_2| - |\log a_2/b_1|$.

In this copending application, it was shown that V would normally vary from a positive value when the auxillary lens was at an infinity position to a negative value when the auxillary lens was at a "near" position with the proper focus position being at the point where the output voltage crossed the zero axis. A suitable coupling was provided between the auxillary lens and the taking lens of a camera so that with proper detection and motive apparatus the taking lens could be automatically placed at the proper focus position with respect to the camera film.

For most photography, the scenes being viewed have a significant contrast and the output signal V in the prior art system is a fairly large positive signal at infinity, a fairly large negative signal at the "near" position and a fairly steep slope to the curve near the zero crossover position. Thus, for most scenes, the detection of the zero cross-over point is quite easily obtained and the auto focus position calculated in a satisfactory manner. It has been found, however, that for very low or 0 contrast conditions, the size of the output signal V may be so small that variations in the parameters of the system, such as a mismatch of the detectors, can cause improper zero cross-over situations to occur. As was explained in the above-referred to copending application, when the proper focus position cannot be readily obtained, it is best for the system to focus at the infinity or the hyperfocal distance, but when a low contrast situation occurs, the zero cross-over point may occur at almost any point including the "near" position in which case an unsatisfactory focus may be obtained.

SUMMARY OF THE INVENTION

The present invention supplies a bias signal to the apparatus of the copending application Ser. No. 085,821 so that, under low contrast conditions, a negative signal occurs as soon as the system begins operation and the apparatus will then focus at the infinity or hyperfocal position as is desired.

DETAILED DESCRIPTION OF THE PREFERRED EMBODIMENT

Figure 1:
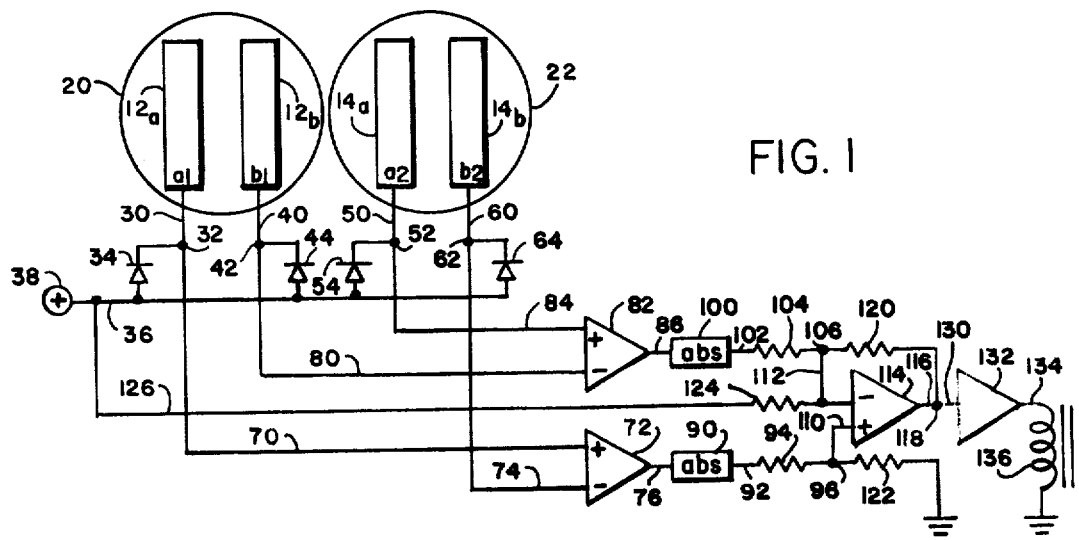
FIG. 1 shows a schematic diagram of the electronics of the present invention.

In FIG. 1, a detector 12a is shown as a box having an output $a_1$, a detector 12b is shown having an output $b_1$, a detector 14a is shown having an output $a_2$ and a detector 14b is shown having an output $b_2$. As was explained in the copending application Ser. No. 085,821, detectors 12a, 12b, 14a and 14b are preferrably photodiodes and the outputs are indicative of the amount of radiation received thereby. The detector pair consisting of detectors 12a and 12b are located behind a first lenslet which produces an image of the exit pupil of the auxillary lens which is shown in FIG. 1 as a circle 20 surrounding both detectors. In like manner, detectors 14a and 14b are located behind a lenslet which produces a different image of the exit pupil of the auxillary lens which is shown by a circle 22 surrounding both detectors. In a proper focus condition, the image 20 will expose both detectors 12a and 12b to the same amount of radiation and the image 22 will expose both detectors 14a and 14b to the same amount of radiation. In an out-of-focus condition, the images 20 and 22 will change in a manner which depends upon the direction that the camera lens is displaced from the proper focus position and the detectors in each pair will receive different amounts of radiation.

the output $a_1$ of detector 12a, indicative of the amount of radiation received by detector 12a, is presented on a line 30 to a junction point 32. Junction point 32 is connected to one side of a logging diode 34 which has its other side connected to a line 36 which in turn is connected to a positive source of potential indicated as terminal 38. The purpose of the logging diode 34 is to change the signal which appears at junction 32 to a log signal representative of the amount of radiation received by detector 12a. Thus, the signal at point 32 will be a magnitude which varies with log $a_1$.

In similar fashion, detector 12b produces the output $b_1$ on a line 40 which is connected to a junction point 42. Junction point 42 is shown connected to one side of a logging diode 44 which has its other side connected to line 36 and the positive source of potential at terminal 38. Logging diode 34 changes signal at junction point 42 to one representative of log $b_1$.

Detector 14a has an output $a_2$ on a line 50 connected to a junction point 52. Junction point 52 is connected to one side of a logging diode 54 which has its other side connected to line 36 and the source of positive potential at terminal 38. Diode 54 operates to change the signal at junction point 52 to one representative of log $a_2$.

Detector 14b has an output $b_2$ which is connected by a line 60 to a junction point 62. Junction point 62 is connected to one side of a logging diode 64 which has its other side connected to line 36 and the source of positive potential at terminal 38. Logging diode 64 operates to change the signal at point 62 to one representative of log $b_2$.

The signal, log $a_1$, at junction point 32 is connected by a line 70 to the positive terminal of a difference amplifier 72 while the signal at junction point 62, representative of log $b_2$, is connected by a line 74 to the negative terminal of a difference amplifier 72. The output of difference amplifier 72 appears on a line 76 and the signal on this line will be representative of log $a_1$ − log $b_2$.

In similar fashion, junction point 42, representative of log $b_1$, is connected by a line 80 to the negative terminal of a difference amplifier 82. Junction point 52, having a signal thereon representative of log $a_2$, is connected by a line 84 to the positive terminal of difference amplifier 82. The output of difference amplifier 82, appearing on line 86, will therefore be representative of log $a_2$ − log $b_1$.

The output of difference amplifier 72 on line 76 is connected to an absolute value circuit 90 having an output on line 92 connected through a resistor 94 to a junction point 96. The operation of absolute value circuit 90 is to change the signal on line 76 to an absolute value so that the signal appearing on line 92 is representative of | log $a_1$ − log $b_2$ | or, to simplify | log $a_1/b_2$ |. In like manner, the output of difference amplifier 82 on line 86 is connected to an absolute value circuit 100 having an output on a line 102 connected through a resistor 104 to a junction point 106. The operation of absolute value circuit 100 is to change the signal on line 86 to one of an absolute value and accordingly, the signal on line 102 is representative of | log $a_2$ − log $b_1$ | or, to simplify, | log $a_2/b_1$ |.

Junction points 96 and 106 are connected by a pair of conductors 110 and 112 respectively to the plus and minus inputs respectively of a difference amplifier 114 having an output on line 116 connected to a junction point 118. Junction point 118 is connected to junction point 106 through a resistor 120 while junction point 96 is connected through a resistor 122 to signal ground. The negative input of difference amplifier 114 is also shown connected by a resistor 124 and line 126 to the source of positive potential at a terminal 38. The signal from terminal 38 through resistor 124 to the negative input of differential amplifier 114 will produce a bias in the system operable to overcome the problem associated with a low contrast condition. The operation of difference amplifier 114 is to subtract the signals on junction points 96 and 106 so that the signal appearing at junction point 118 is indicative of | log $a_1/b_2$ | − | log $a_2/b_1$ | − $V_2$ where $V_2$ is the bias signal appearing through resistor 124. It should be noted that this equation represents the desired function used for the operation of the auto focus system. The signal on junction point 118 is connected by a line 130 to a power amplifier 132 having an output on a line 134 connected through a solenoid 136 to signal ground. Except for the additional positive signal from the source 38 through resistor 124 in FIG. 1, the circuit described above is the same as that shown in the copending application Ser. No. 085,821.

Figure 2:
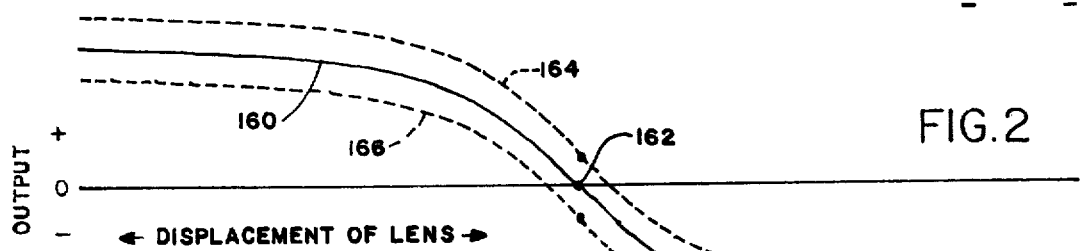
FIG. 2 shows the output signal as it might vary with displacement of the lens in a normal contrast situation.

In FIG. 2, the signal which appears at junction point 118 is plotted against the position of the auxillary lens of the camera from an infinity position at the left to a near position at the right. The output voltage at point 118, is represented in FIG. 2 by a curve 160 which is seen to start at a plus value on the left hand or infinity side of FIG. 2, to cross over the zero axis at a point 162 near the middle of the curve and to extend into the negative portion as the auxillary lens approaches the right hand or "near" position. The curve 160 of FIG. 2 is the curve that would exist with the prior art circuit not utilizing the additional voltage source from resistor 124 of FIG. 1. Curve 160 is indicative of the situation that exists when there is a relatively normal contrast condition in the scene being viewed. On either side of curve 160 in FIG. 2 there is shown a dashed line 164 and 166 respectively. Lines 164 and 166 represent the possible variation that can occur in the output signal due to variations in circuit parameters of FIG. 1. For example, if there were slight mismatches in the detectors 12a, 12b, 14a and 14b, or if other circuit elements such as the absolute value circuits 100 and 90 operated slightly differently, the signal appearing at point 118 could be in error by as much as line 164 in a positive direction or line 166 in a negative direction. Thus, the curve 160 is not an exact curve but may have any value lying between lines 164 and 166 depending upon the characteristics of the electronics of the system. The range between curves 164 and 166 is readily calculatable when the circuit parameter variations are known.

Figure 3:
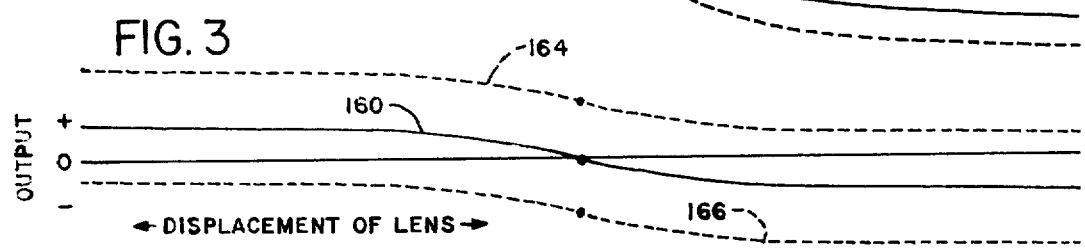
FIG. 3 shows the output signal as it might vary with displacement of the lens under a low constrast situation.

Under normal contrast conditions, the slight possible variation in curve 160 will cause no difficulty since the zero cross-over position will be quite close to point 162 regardless of the variation of circuit parameters. Under a low contrast condition, however, this sllight variation between curves 164 and 166 can cause serious difficulty. For example, in FIG. 3, the output curve 160 is again shown representing the output signal at point 118 of FIG. 1 but in FIG. 3 the contrast of the scene being viewed is very low so that the magnitude of the signal of the system is rather small at both the infinity and "near" ends of the displacement. The envelope consisting of lines 164 and 166 is again shown, although in FIG. 3 it is exaggerated for clarity, and as can be seen the envelope is into the negative region on the left hand side of FIG. 3 since line 166 extends below the zero axis and is into the positive region on the right hand side of FIG. 3 since the curve 164 extends above the zero axis. Thus, when a scene with low contrast is encountered, the actual signal appearing at point 118 of FIG. 1 may vary so as to cross over the zero axis anywhere along the axis and may cause the system to stop the taking lens of the camera at the wrong position. This is most serious where the zero cross-over or false focus position is at the "near" extreme of travel since then the camera lens will be focusing on a near object and if the actual object is more remote, it will be badly out of focus. As explained above, when the actual focus position cannot be accurately determined, it is desired that the system operate as a box camera and become focused at infinity or at the hyperfocal distance.

Figure 4:
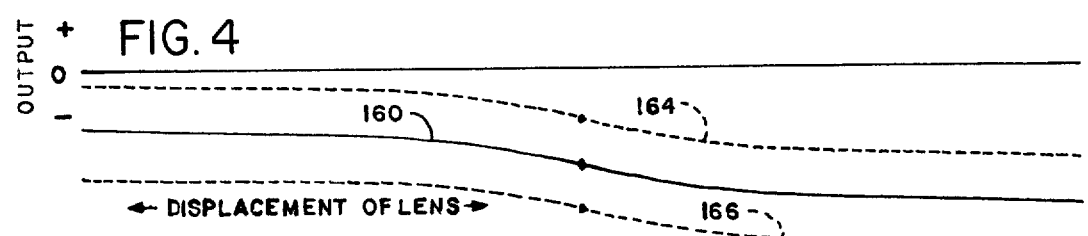
FIG. 4 shows the output signal as it might vary with the displacement of the lens in the low contrast situation of FIG. 3 but utilizing the bias of the present invention.

To overcome the problem, the bias signal from voltage source 38, line 126 and resistor 124 of FIG. 1 has been introduced into the circuit of the prior art. This has the effect of adding a negative signal to the output at point 118 which may be thought of as either raising the zero axis of FIG. 3 or lowering the curve 160. For example, in FIG. 4, the low contrast curve 160 of FIG. 3 has been shown at a lowered position with respect to the zero axis by an amount substantially equivalent to the distance between curves 164 and 166 of FIG. 3. By doing this, the curve 164 now lies entirely below the zero axis at the left hand side or infinity position of the graph and thus when the system begins operating and a low contrast condition exists, a negative voltage will immediately appear at point 118 and the solenoid 136 of FIG. 1 will operate to stop the motion of the taking lens of the camera at the infinity or hyperfocal position. Since the system parameters that vary in FIG. 1 will all be within the envelope of the curves 164 and 166, under the low contrast conditions no signal can cross the zero axis and no false zero cross-over signal will occur. Therefore, the camera will operate as a box camera focusing at the desired hyperfocal or infinity distance.

Figure 5:
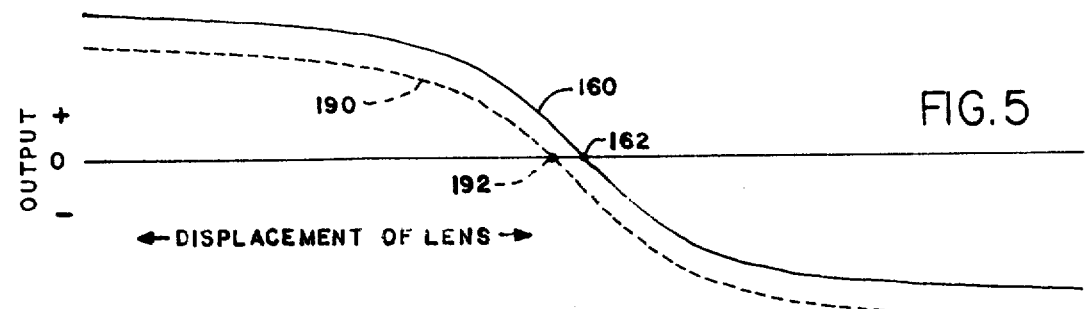
FIG. 5 shows how the output signal might vary with the displacement of the lens in the normal contrast situation of FIG. 2 but utilizing the bias of the present invention.

FIG. 5 shows the curve 160 in a normal contrast situation as in FIG. 2 and shows a second curve 190 parallel to but displaced downwardly therefrom. Curve 190 represents the curve the system will operate along in a normal contrast situation but with the bias of the present invention. It is seen that with the bias supplied by the apparatus of FIG. 1, the curve 160 of FIG. 1 will now be displaced downwardly to the position of curve 190 by an amount equal to the bias signal and this will have the effect of moving the junction point 162 of FIG. 2 slightly to the left so that a new zero cross-over point occurs at a point 192. Thus, the system will now focus at a point 192 which may not be the exact true focus position but it has been found that the distance between points 162 and 192 is so small that the focus error is of no consequence.

It is therefore seen that I have provided an improved low cost auto focus system which may be utilized in inexpensive cameras and may be operable over a range of difference contrast conditions from low contrast to high contrast. Many obvious alterations will occur to those skilled in the art and I do not wish to be limited to the specific disclosures used in connection with the preferred embodiment. I intend only to be limited by the following claims.

The embodiments of the invention in which an exclusive property or right is claimed are defined as follows:

1. In apparatus for use in an auto focus system which produces an output signal that varies in magnitude with the position of a lens movable between first and second extremity positions and that receives radiation from a field of view containing an object to be focused upon, the output signal normally having a first characteristic when the lens is at the first extremity position, having a second characteristic when the lens is at the second extremity position and having a third characteristic when the lens is at a position corresponding to the focus position for the object, the magnitude of the signal decreasing under low contrast conditions in the scene so that the first and second characteristics approach the third characteristic thereby permitting a possible third characteristic to exist at other than the position corresponding to the focus position for the object, the improvement comprising:

bias means connected to the system and operable to change the output signal by a predetermined amount away from the first condition towards the second condition, the predetermined amount being chosen so that under low contrast conditions in the scene, the output signal is in the second condition when the lens is at the first extremity.

2. Apparatus according to claim 1 wherein the first condition is a positive value, the second condition is a negative value and the third condition is a zero value.

3. Apparatus according to claim 2 wherein the first extremity position corresponds to an "infinity" position and the second extremity position corresponds to a "near" position.

4. Apparatus according to claim 2 wherein the first extremity position corresponds to the "hyperfocal" position and the second extremity position corresponds to a "near" position.

5. In apparatus for use in an auto focus system operable to transmit radiation from a scene containing an object to be focused upon, the system including (i) a lens movable from a first position where a far removed object is in focus at a focus plane to a second position where a near object is in focus at the focus plane, (ii) a circuit operable to produce an output signal which varies in magnitude with circuit parameter variations, with the contrast in the scene and with the position of the lens, the output signal having a first magnitude when the lens is at a position where the object is in focus at the focus plane, under normal contrast conditions the output signal having a magnitude significantly greater than the first magnitude when the lens is displaced towards the first position and having a magnitude significantly smaller than the first magnitude when the lens is displaced towards the second position and, under low contrast conditions, the output signal having a magnitude which is near the first magnitude in all positions of the lens, (iii) means to move the lens from the first position to the second position and (iv) motive means reponsive to the output signal to stop the lens when the output signal magnitude is no greater than the first magnitude, the improvement comprising:

bias means connected to the circuit and operable to reduce the magnitude of the output signal by a predetermined amount so that at low contrast conditions the magnitude of the output signal is no greater than the first magnitude when the lens is at the first position thereby causing the motive means to stop the lens at least near the first position.

6. Apparatus according to claim 5 wherein the first magnitude is zero.

7. Apparatus according to claim 5 wherein the motive means under low contrast conditions stops the lens at the hyperfocal position.

8. Apparatus according to claim 5 wherein the predetermined amount is at least as great as the inherent variations which may occur in output signals due to circuit parameter variations.

* * * * *